United States Patent
Bartoszewski et al.

(10) Patent No.: US 9,840,228 B2
(45) Date of Patent: Dec. 12, 2017

(54) METHOD FOR ACTIVATING OR DEACTIVATING FUNCTIONS AND DEVICE FOR INFLUENCING FUNCTIONS IN A MOTOR VEHICLE

(71) Applicant: Volkswagen Aktiengesellschaft, Wolfsburg (DE)

(72) Inventors: Heiner Bartoszewski, Gifhorn (DE); Mirko Vujasinovic, Wolfsburg (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 406 days.

(21) Appl. No.: 14/564,576

(22) Filed: Dec. 9, 2014

(65) Prior Publication Data
US 2015/0091378 A1   Apr. 2, 2015

Related U.S. Application Data

(63) Continuation of application No. PCT/EP2013/059368, filed on May 6, 2013.

(30) Foreign Application Priority Data

Jun. 9, 2012   (DE) .................. 10 2012 011 483

(51) Int. Cl.
*B60L 1/00* (2006.01)
*B60R 25/00* (2013.01)
(Continued)

(52) U.S. Cl.
CPC ......... *B60R 25/00* (2013.01); *B60H 1/00642* (2013.01); *B60R 16/037* (2013.01)

(58) Field of Classification Search
CPC .... B60R 25/00; B60R 16/037; B60H 1/00642
USPC .......... 307/10.1, 9.1, 10.2, 10.3, 10.4, 10.5, 307/10.6, 10.7, 10.8; 340/425.5, 426.13, 340/426.14, 426.15, 426.16, 426.17, 340/426.18, 426.19, 426.22, 426.23;
(Continued)

(56) References Cited

U.S. PATENT DOCUMENTS

| 5,646,524 A | 7/1997 | Gilboa |
| 7,477,971 B2 | 1/2009 | Lang |

(Continued)

FOREIGN PATENT DOCUMENTS

| CN | 102361780 A | 2/2012 |
| DE | 198 42 545 A1 | 3/2000 |

(Continued)

*Primary Examiner* — Thomas Skibinski
(74) *Attorney, Agent, or Firm* — Muncy, Geissler, Olds & Lowe, P.C.

(57) ABSTRACT

A method for activating or deactivating functions in a motor vehicle is provided. A control signal for activating or deactivating at least one function can be input via at least one interface. At least one function includes timer programming and/or at least one function can be activated or deactivated in a remotely controllable manner from outside the motor vehicle via the communication interface. At least one control command is input via at least one interface, via which control command an activation or deactivation of the function is blocked via the timer programming and/or via the communication interface. A device for influencing functions in a motor vehicle is also provided.

14 Claims, 1 Drawing Sheet

(51) Int. Cl.
*B60R 16/037* (2006.01)
*B60H 1/00* (2006.01)

(58) Field of Classification Search
USPC ....... 701/2, 1, 22, 28, 29.1, 31.6, 31.7, 31.8, 701/36, 33.4, 33.6, 34.2, 34.4, 39, 113, 701/31.5
See application file for complete search history.

(56) References Cited

U.S. PATENT DOCUMENTS

| | | |
|---|---|---|
| 8,819,327 B2 | 8/2014 | Hartwich |
| 2004/0204816 A1* | 10/2004 | Dery .................... B60R 25/045 701/113 |
| 2012/0072055 A1* | 3/2012 | Barlsen .................. B60T 8/885 701/2 |

FOREIGN PATENT DOCUMENTS

| | | |
|---|---|---|
| DE | 102 56 536 A1 | 6/2004 |
| DE | 10 2006 038 522 A1 | 5/2007 |
| DE | 10 2006 056 115 A1 | 5/2008 |
| DE | 10 2008 000 561 A1 | 9/2009 |
| DE | 10 2009 022 362 A1 | 11/2010 |
| EP | 1 650 074 A1 | 4/2006 |
| JP | 2003-524751 A | 8/2003 |
| KR | 10-2007-0101702 A | 10/2007 |
| WO | 99/42856 A2 | 8/1999 |

\* cited by examiner

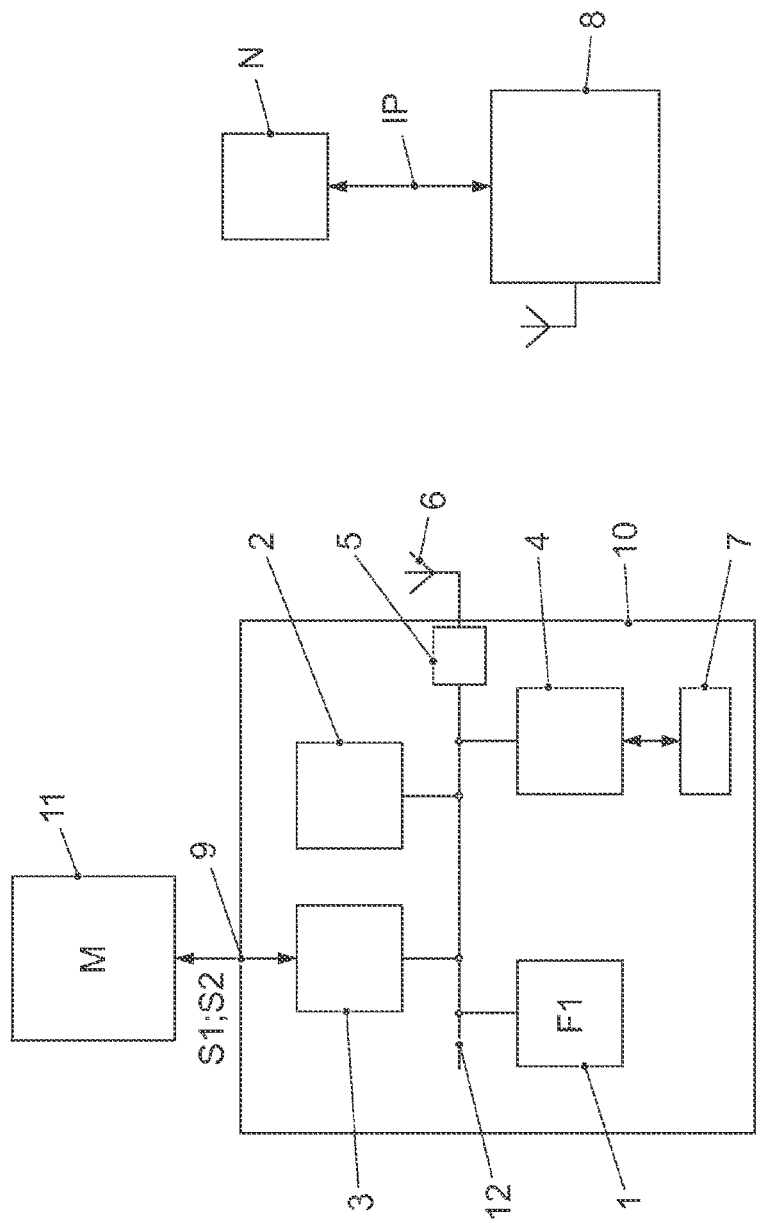

ary application is a continuation of International Application No. PCT/EP2013/059368, which was filed on May 6, 2013, and which claims priority to German Patent Application No. 10 2012 011 483.4, which was filed in Germany on Jun. 9, 2012, and which are both herein incorporated by reference.

BACKGROUND OF THE INVENTION

Field of the Invention

The invention relates to a method for activating or deactivating functions in a motor vehicle, and a device for influencing functions in a motor vehicle.

Description of the Background Art

Functions in motor vehicles can be activated or deactivated without a user action taking place at the motor vehicle. This can take place by a remote control integrated into a motor vehicle key, for example. Furthermore, consideration has been given to the idea that the user can communicate with the motor vehicle either directly through an online connection or through a server. Lastly, functions in a motor vehicle are also known that have timer programming, and thus activate or deactivate automatically at a specific time. For example, auxiliary heaters with timer programming are known.

From DE 10 2006 038 522 A1, a method is known for avoiding invalid operating modes in an electronic stability control in a motor vehicle, wherein the electronic stability control can be switched between a first operating mode provided for on-road operation of the motor vehicle and a second operating mode provided for operation of the motor vehicle on a dynamometer, wherein a driver warning is triggered when it is determined that a test criterion is met indicating that on-road operation of the motor vehicle is intended while the second operating mode is switched on.

SUMMARY OF THE INVENTION

It is therefore an object of the invention to provide a method for activating or deactivating functions and a device for influencing functions in a motor vehicle, by which means handling of the motor vehicle, in particular in a repair shop, is improved.

In an embodiment, a method for activating or deactivating functions in a motor vehicle, wherein a control signal for activating or deactivating at least one function can be input through at least one interface, wherein at least one function comprises timer programming and/or at least one function can be activated or deactivated by remote control from outside the motor vehicle through a communications interface, comprises the method step that at least one control command is input through at least one interface, by means of which command an activation or deactivation of the function through the timer programming and/or through the communications interface is disabled. A manual activation or deactivation through the interface can continue to be possible here, however. Especially in the case of repair shop work, it is thus possible to reliably prevent functions from being activated or deactivated suddenly, which could result in irritating the repair shop staff and/or could disrupt repair shop activity. In this context, the interface for the control command for disabling the function can be the same interface through which the function is activated or deactivated, but does not have to be. Oftentimes, the important thing is to prevent activation of the function, in which case the disabling is a deactivation that cannot be lifted for the time being. However, cases are also possible in which there should generally be no inexplicable changes in state, so that even a deactivation through the timer or the communications interface should be prevented. Consequently, the term disabling includes a deactivation of the function, but can also be more comprehensive (disabling of activation and deactivation). An embodiment is also possible in which only the deactivation or only the activation of the functions is disabled. Disabling of the functions preferably takes place in a repair shop, but is not limited to this use.

In this context, provision can additionally be made for all functions with timer programming and/or the functions that can be activated or deactivated by remote control through the communications interface to be disabled by means of the control command. Preferably, however, a graduated disabling is possible, which is to say that functions can be disabled individually, in groups, or as a whole. As a result it is possible, for example, to inspect a single function with timer programming while the rest of the functions with timer programming are disabled. In addition, provision can be made for the disabling to require authentication, such as by means of a password or PIN.

In another embodiment, the interface for disabling the function is implemented as a vehicle diagnostic interface and/or as an operator interface in the motor vehicle.

In another embodiment, the control command for disabling the function is transmitted centrally to a control unit in the motor vehicle, wherein this control unit informs the control units in question for carrying out the functions to be disabled, which preferably takes place through a vehicle bus system such as a CAN bus or FlexRay bus, for example.

In an alternative embodiment, the control units in question for carrying out the functions to be disabled are informed directly through the control command or commands.

In another embodiment, the motor vehicle is connected through the communications interface to an external server, wherein the disabling of the functions takes place through the server. In the simplest case, for this purpose the server simply interrupts the communication with the communications interface. However, then the functions with timer programming cannot be disabled through the server, but instead only external access can be disabled. Communication of the disabling to the server in this embodiment can take place through any desired data transmission path or else through the communication channel between the motor vehicle and server.

In another embodiment, the disabling of functions is signaled in the motor vehicle and/or in an external vehicle diagnostic system and/or through the communications interface so that in the latter case the disabling can be displayed on the external server and/or a computer workstation of a user.

In another embodiment, a module is stored in the motor vehicle and/or in the vehicle diagnostic system by which means functions with timer programming and/or functions that can be activated through the communications interface are identified. This is advantageous because the structure of the motor vehicle can change due to retrofitting, so that, for example, the vehicle diagnostic system cannot identify all affected functions from the information provided by the manufacturer.

In another embodiment, the disabling of the functions is lifted through an additional control command. This takes place in a manner analogous to the procedure for disabling and through the same interface, for example.

In another embodiment, the disabling is automatically lifted as a function of at least one parameter. It is thus ensured that the motor vehicle operator can use the functions again even if the repair shop worker has forgotten the re-enabling, for example. The parameters can be, for example, the vehicle speed, a distance traveled, the use of a particular vehicle key, or a similar parameter from which usage by the motor vehicle operator can be inferred. Combinations of parameters are also possible.

The device for influencing functions in a motor vehicle is characterized in that at least one control command can be generated by means of the device, by means of which command it is possible to disable at least one function with timer programming and/or at least one function that can be activated or deactivated by remote control from outside the motor vehicle through a communications interface.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which is given by way of illustration only, and thus, is not limitive of the present invention, and wherein the FIGURE illustrates a schematic configuration for carrying out the method according to the invention.

DETAILED DESCRIPTION

Schematically shown in the FIGURE is a motor vehicle 10 that has five control units 1 to 5. The control units 1-5 are connected to one another by at least one vehicle bus 12, wherein the control units 1-5 normally are located in different vehicle busses that are connected to one another through gateway control units. In addition, the vehicle bus 12 is connected through the control unit 5 to a communications interface 6 in the form of an antenna. In the simplest case, the control unit 5 routes data between the communication channels (for example, CAN from the vehicle bus 12 and WLAN from the communications interface 6). However, an additional functional layer can also be provided in the control unit 5. The first control unit 1 is the control unit of an auxiliary heater, for example, which can be turned on and off independently by means of timer programming. Alternatively, the auxiliary heater can be turned on and off manually by means of a control element in the motor vehicle 10. In this context, the control element can be part of a display and operating panel 7 that is operated by the fourth control unit 4. The function with timer programming is labeled F1 here. Provision can additionally be made here that the timer programming can be carried out by the user N through the communications interface 6. The second control unit 2 executes a function F2 that can be remotely controlled through the communications interface 6. For this purpose, the user N can either transmit control commands to the control unit directly through the communications interface 6 (for example via WLAN) or indirectly through an external server 8, which is administered by the vehicle manufacturer, for example. In this context, the connection between the user N and external server 8 can be an Internet connection IP, for example. The third control unit 3 has a vehicle diagnostic interface 9, to which a vehicle diagnostic system 11 can be connected.

Now if the motor vehicle 10 is brought to a repair shop, the vehicle diagnostic system 11 is connected to the vehicle diagnostic interface 9. By means of a module M, the vehicle diagnostic system 11 searches the motor vehicle 10 for functions F1 with timer programming and for functions F2 that can be remotely controlled through the communications interface 6. The functions F1, F2 that are found are then displayed, for example on a display unit of the vehicle diagnostic system 11, and disabled individually, in groups, or as a whole. To this end, the vehicle diagnostic system 11 transmits a control command S1 to the third control unit 3. The third control unit 3 then transmits a message to the first and second control units 1, 2 that the functions F1, F2 are disabled. In response, the first control unit 1 does not execute the timer process. In like manner, the second control unit 2 ignores control commands that it receives through the communications interface 6. The disabling of the functions F1, F2 in the control units 1, 2 can take place by setting a bit, for example. The fact that the disabling has taken place can then be displayed in the vehicle diagnostic system 11 and/or on the display and operating panel 7. It is also possible for a message that disables the transmission of control commands for the functions F1, F2 to be transmitted to the communications interface 6 or the control unit 5. In addition, the server 8 or the user N can be informed directly through the communications interface 6 of the disabling. Depending on the embodiment and the function, the disabling in this context can achieve the result that the function can be neither activated nor deactivated, which is to say that it maintains its current state. Alternatively, provision can be made that the only remaining possibility for the function is for it to be activated. Once servicing of the motor vehicle 10 has been completed, the disabling of the functions F1, F2 by the vehicle diagnostic system 11 can be reset again by a control command S2. Accordingly, re-enabling is signaled. Then the vehicle diagnostic system 11 is removed from the vehicle diagnostic interface 9. On the other hand, if the repair shop staff forgets to undertake the re-enabling, this can be carried out automatically by the third control unit 3, which to this end evaluates parameters from which the termination of the repair stop stay can be inferred. Alternatively or cumulatively, the disabling or re-enabling of the functions F1, F2 can also be accomplished through the display and operating panel 7 or the external server 8.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for activating or deactivating functions in a motor vehicle, the method comprising:
    inputting a control signal for activating or deactivating at least one function through at least one interface, wherein at least one function comprises timer programming and/or at least one function is activated or deactivated by remote control from outside the motor vehicle through a communications interface; and inputting at least one control command through the at least one interface, wherein, the control command disables an activation or deactivation of the function through the timer programming and/or through the communications interface, wherein a module is stored in the motor vehicle and/or in a vehicle diagnostic system, the module identifying the functions with timer programming and/or the functions that are activated through the communications interface.

2. The method according to claim 1, wherein the at least one interface for disabling the functions is implemented as a vehicle diagnostic interface and/or as an operator interface in the motor vehicle.

3. The method according to claim 1, wherein the at least one control command for disabling the functions is transmitted centrally to a control unit in the motor vehicle, wherein this control unit informs the affected control units for carrying out the functions to be disabled.

4. The method according to claim 1, wherein the affected control units for carrying out the functions to be disabled are informed directly through the at least one control command or commands.

5. The method according to claim 1, wherein the motor vehicle is connected through the communications interface to an external server, and wherein the disabling of the functions takes place through the server.

6. The method according to claim 1, wherein the disabling of the functions is signaled in the motor vehicle and/or in an external vehicle diagnostic system and/or through the communications interface.

7. The method according to claim 1, wherein the disabling of the functions are lifted through at least one additional control command.

8. The method according to claim 1, wherein the disabling of the functions is automatically lifted by evaluation of at least one parameter.

9. The method according to claim 8, wherein the at least one parameter includes vehicle speed or a distance traveled, such that the at least one parameter infers that the disabling of the functions is no longer required.

10. The method according to claim 1, wherein the at least one control command is transmitted from the vehicle diagnostic system, wherein the vehicle diagnostic system is connected to the motor vehicle via a vehicle diagnostic interface.

11. A device for influencing functions in a motor vehicle, wherein at least one control command is generated by the device, via which command at least one function with timer programming is disabled and/or at least one function that is activated or deactivated by a remote control from outside the motor vehicle through a communications interface is disabled, wherein a module is stored in the motor vehicle and/or in a vehicle diagnostic system, the module identifying the functions with timer programming and/or the functions that are activated through the communications interface.

12. The device according to claim 11, wherein the device is the vehicle diagnostic system.

13. A method for activating or deactivating functions in a motor vehicle, the method comprising:

inputting a control signal for activating or deactivating at least one function through at least one interface, wherein at least one function comprises timer programming and/or at least one function is activated or deactivated by remote control from outside the motor vehicle through a communications interface; and inputting at least one control command through the at least one interface, wherein, the control command disables an activation or deactivation of the function through the timer programming and/or through the communications interface, wherein the at least one control command for disabling the functions is transmitted centrally to a control unit in the motor vehicle, wherein the control unit that receives the at least one control command instructs other control units, that carry out the functions, to be disabled.

14. The method according to claim 13, wherein the at least one control command is transmitted from a vehicle diagnostic system, wherein the vehicle diagnostic system is connected to the motor vehicle via a vehicle diagnostic interface.

* * * * *